(12) United States Patent
Collins

(10) Patent No.: US 10,934,808 B2
(45) Date of Patent: Mar. 2, 2021

(54) METHOD OF ABANDONING A WELL

(71) Applicant: Aubin Limited, Aberdeenshire (GB)

(72) Inventor: Patrick Joseph Collins, Aberdeenshire (GB)

(73) Assignee: Aubin Limited, Aberdeenshire (GB)

( * ) Notice: Subject to any disclaimer, the term of this patent is extended or adjusted under 35 U.S.C. 154(b) by 260 days.

(21) Appl. No.: 15/777,298

(22) PCT Filed: Dec. 9, 2016

(86) PCT No.: PCT/GB2016/053881
§ 371 (c)(1),
(2) Date: May 18, 2018

(87) PCT Pub. No.: WO2017/098256
PCT Pub. Date: Jun. 15, 2017

(65) Prior Publication Data
US 2020/0131887 A1    Apr. 30, 2020

(30) Foreign Application Priority Data
Dec. 11, 2015 (GB) ..................................... 1521886

(51) Int. Cl.
*E21B 37/06* (2006.01)
*E21B 33/138* (2006.01)
*C09K 8/42* (2006.01)
*C09K 8/504* (2006.01)

(52) U.S. Cl.
CPC ............ *E21B 37/06* (2013.01); *E21B 33/138* (2013.01); *C09K 8/426* (2013.01); *C09K 8/5045* (2013.01)

(58) Field of Classification Search
CPC . C09K 8/68; C09K 8/035; C09K 8/62; C09K 8/528; C09K 8/602; C09K 8/467; C09K 8/52; C09K 2208/32; C09K 8/42; E21B 43/26; E21B 37/06; E21B 43/16; E21B 33/13; E21B 43/25
See application file for complete search history.

(56) References Cited

U.S. PATENT DOCUMENTS 5,244,043 A    9/1993  Shuler
2003/0121662 A1  7/2003  Bosma et al.

FOREIGN PATENT DOCUMENTS

| EP | 0781729 A1 | 7/1997 |
| GB | 2439076 A | 12/2007 |
| WO | 9630626 A1 | 10/1996 |
| WO | 0031209 A1 | 6/2000 |
| WO | 2007091032 A1 | 8/2007 |

OTHER PUBLICATIONS

International Search Report for Application No. PCT/GB2016/053881 dated Feb. 17, 2017, 4 pages.
Barclay, Ian et al., "The Beginning of the End: A Review of Abandonment and Decommissoning Practices", Oilfield Rev., vol. 13, Dec. 31, 2001, pp. 28-41.

*Primary Examiner* — Zakiya W Bates
(74) *Attorney, Agent, or Firm* — Howard & Howard Attorneys PLLC

(57) ABSTRACT

A method of a bandoning a well in a reservoir. The method including the step of forming a scale in the reservoir by introducing into the reservoir a first solution comprising a first scale precursor and a second solution comprising a second scale precursor and a scale inhibitor. The first solution and second solution are able to react together to form the scale. The method further includes the step of at least partially filling the well with cement.

13 Claims, 3 Drawing Sheets

METHOD OF ABANDONING A WELL

CROSS-REFERENCE TO RELATED APPLICATIONS

The present application is the National Stage of International Patent Application No. PCT/GB2016/053881 filed on Dec. 9, 2016, which claims priority to and all the benefits of GB Application No. 1521886.0 filed on Apr. 17, 2015, which are hereby expressly incorporated herein by reference in their entirety.

The present invention relates to a method of abandoning a well in a reservoir.

When an oil and/or gas well has reached the end of its economic life, it needs to be made safe and abandoned such that the chance of any uncontrolled release of hydrocarbons to the environment is mitigated.

It would be best if the reservoir could be returned as close as possible to its original state. Traditionally wells have been plugged with cement. However there are concerns that cement alone is an insufficient barrier and that hydrocarbons may still escape to the surface through annuli and cracks behind casing, between casings and through the cement.

These annuli and cracks generally form as a result of poorly installed casing cement, poor cement bonds, or more commonly the passage of time which with cycles of tension and compression can cause fractures and failures in the cement.

One approach suggested to address these concerns is to mill away the casing thereby exposing the reservoir and then filling the space created with cement, thereby creating an artificial cap rock. While such an approach might be effective, it is likely to be extremely expensive because it requires the use of a drilling rig.

Any material used to plug the well should last and/or be stable in-situ for many, typically thousands of years.

In accordance with a first aspect of the present invention there is provided a method of treating a well in a reservoir, the method comprising the step of forming a scale in the reservoir by introducing into the reservoir a first solution comprising a first scale precursor, a second solution comprising a second scale precursor and a scale inhibitor, wherein the first solution and second solution are able to react together to form the scale.

The first and second scale precursors i.e. the first and second solutions containing these materials are blended together prior to being introduced into the reservoir, either just before the fluids enter the well or when one fluid is pumped down the tubing and the other down the annular space between the tubing and the casing, so they mix just prior to entering the reservoir and are then able to react together to form a scale. The first and second solutions may contain additional components as appropriate for specific applications. Additional components may include viscosity modifiers, flow improvers, surfactants, emulsifiers etc.

The method may comprise the step of introducing separately into the reservoir the first and the second solutions.

It is generally preferred that the second solution as defined below containing a Group 2 cation, also contains the scale inhibitor rather than having the scale inhibitor present in the first solution.

Scale formation occurs in the reservoir even though there is a scale inhibitor present in the mixture of the first and second scale precursors. In an alternative embodiment, it is possible that both the first and second solutions could each contain a scale inhibitor; the scale inhibitor present in each in this case could be the same or equally may be different. Similarly, the amount of scale inhibitor provided in each of the two solutions may be the same or different. The scale inhibitor may be referred to as a scale-formation inhibitor. This inhibitor may be any scale-forming inhibitor known in the art.

In one embodiment, the first scale precursor is a soluble inorganic salt. For ease of reference, this soluble inorganic salt can be referred to as the first inorganic salt. The first inorganic salt may be a salt of a Group 1 metal in which the Group 1 metal provides the cationic species. Sodium or potassium are preferred and sodium is a particularly preferred metal. The counterion of the first inorganic salt is an inorganic anion. This may be a single element or a complex anion. Sulphate is particularly preferred as an anion. Carbonate or bicarbonate could also be used as an anion.

In another embodiment, the second scale precursor is a soluble inorganic salt. For ease of reference, this soluble inorganic salt can be referred to as the second inorganic salt. The second inorganic salt may be a salt of a Group 2 metal in which the Group 2 metal provides the cationic species. The Group 2 metal could be calcium, strontium or barium, but calcium is preferred because it is both more economical and less toxic. The counterion of the second inorganic salt is an inorganic anion. Suitable anions include halide anions, and amongst these chloride is particularly preferred. Other anions which also form a soluble salt with the Group 2 metal could in principle be used. For example, nitrates form soluble salts with Group 2 metals and thus would be suitable although less preferred on grounds of cost and environmental impact.

In a preferred embodiment of the method the scale is calcium sulphate. In this case, the first solution will contain the sulphate anion. Preferably this is in the form of sodium sulphate. At the same time, the second solution will contain the calcium cation together with the scale inhibitor. The calcium cation is preferably in the form of calcium chloride. The calcium chloride and sodium sulphate then react to form the scale. One of the key benefits of calcium sulphate in particular is that it is highly insoluble.

Furthermore, it is thermodynamically very stable and, having formed within the well, the reaction cannot easily be reversed. As such, its formation can be considered to be permanent. A further advantage of calcium sulphate is that its solubility reduces as temperature is increased. Consequently, at the elevated temperatures present in the reservoir, it enjoys even lower solubility than under ambient conditions. This also assists in the permanent nature of the scale that is formed.

In an alternative embodiment, the scale is calcium carbonate. In this case, the first solution will contain the carbonate anion or bicarbonate anion, and the second solution will contain the calcium cation together with the scale inhibitor. The carbonate anion or bicarbonate anion are preferably in the form of sodium carbonate or sodium bicarbonate. Again, the calcium cation is preferably in the form of calcium chloride.

The method of treating the well in the reservoir is typically a method of abandoning the well in the reservoir. The well typically comprises a well bore.

The step of adding the solutions into the reservoir may include injecting and/or pumping the solutions into the reservoir.

In one embodiment, the amount of scale inhibitor provided in the second solution is reduced during the treatment process. In those cases in which scale inhibitor is provided in both the first solution and in the second solution, it is the overall amount of scale inhibitor that is reduced. This may involve reducing the amount in each solution independently. Alternatively, this may simply involve reducing the amount of scale inhibitor in one of the two solutions. Control of the amount of scale inhibitor present in the first and second solutions once mixed can be used to control the rate of scale formation. By utilising a relatively higher, as compared to later in the process, concentration of scale inhibitor at the beginning of the treatment method, it is typically possible to ensure that the more remote parts of the reservoir are treated first and/or that scale formation is effected in those more distant locations first. It is a fairly common problem in certain prior art methods that sometimes scale formation can be erratic or not uniform. In more extreme cases, unwanted scale formation can occur at or near the well itself leading to ineffective sealing of the reservoir as a whole.

The present invention overcomes this difficulty with prior art methods by providing a two-component system. In addition, control of scale formation can be further enhanced by varying the concentration of scale inhibitor in the second solution as time progresses, or indeed by controlling i.e. reducing, the total concentration of scale inhibitors if they are present in both the first and second solutions. Thus, over the duration of the process the concentration of scale inhibitor may be reduced by a factor of at least ¼ i.e. a 25% reduction, and more preferably by a factor of at least ½ % i.e. a 50% reduction relative to the initial concentration of scale inhibitor at the start of the process. In certain instances, it is possible to reduce the concentration by a factor of 10 or more. This allows a more uniform formation of scale within the reservoir. Importantly, this allows the scale formation to start at the more distant parts of the reservoir and to progress back towards the well. This ensures a more effective sealing compared to prior art methods.

The scale may be any inorganic scale. The scale may be barium sulphate or calcium sulphate. The scale typically forms a deposit on surfaces of the reservoir. The scale is typically a solid and normally a solid that is not readily soluble, by for example an acid and/or a hydrocarbon. The scale is therefore a relatively stable material and may be referred to as a very stable material at temperatures and pressures typically occurring at the bottom of a well and/or in a reservoir.

Ideally the scale will have a solubility product ($K_{SP}$) at ambient temperature (25° C.) of $1 \times 10^{-5}$ and more preferably a $K_{SP}$ at ambient temperature (25° C.) of $1 \times 10^{-6}$.

The scale inhibitor typically reduces the rate of reaction between other components and/or substances of the first and/or second solution and a fluid in the reservoir or between components and/or substances of the first and/or second solution. It therefore serves to reduce the rate of scale formation. If for example the first and second solution comprises Barium Chloride and Sodium Sulphate respectively, the scale inhibitor may reduce the rate of reaction between these two components and therefore the rate of production of Barium Sulphate.

The scale inhibitor typically does not prevent scale production, rather it affects, typically slows, reaction kinetics, that is the rate of reaction between components of the first and/or second solution. It is this that allows the rate and, more importantly, the position of scale formation to be controlled by the method of the present invention.

The scale inhibitor normally therefore needs to be in a sufficient concentration, known as the minimum inhibitory concentration (MIC). The MIC is determined by a number of factors, the thermodynamic drive of components of the first and/or second solution, the physical conditions in the well such as temperature, pressure and pH; and the length of time scale inhibition is required. Typically for any given system the time that scale inhibition is required is proportional to the concentration of scale inhibitor present assuming all other variables are constant.

The concentration of scale inhibitor in the first and/or second solution or a mixture of the first and second solution may be from 0.5% to 10%. The scale inhibitor may substantially reduce the rate of scale formation for up to 24 hours, typically up to 12 hours and preferably from 4 to 8 hours after the step of adding the first and/or second solution into the reservoir to form a scale. The scale inhibitor may substantially reduce the rate of scale formation for up to 12 hours, typically up to 6 hours and preferably from 1 to 2 hours after the step of adding the first and/or second solution or a mixture of the first and second solution into the reservoir to form a scale.

After the step of adding the first and/or second solution into the reservoir to form a scale, the scale inhibitor may adsorb onto surfaces of the reservoir. Adsorption of the scale inhibitor reduces the amount of the scale inhibitor available. The amount of the scale inhibitor reduces and/or diminishes with an increase in the distance from the well. It may be an advantage of the present invention that this acts to accelerate scaling and precipitation within the reservoir in these areas.

As subsequent scale inhibitor enters the reservoir, an equilibrium between adsorbed scale inhibitor and free scale inhibitor is normally achieved. It may then be desirable to reduce the amount of inhibitor added to the well to take account of this and therefore allow scale to form closer to the well and/or well bore. The scale inhibitor may be added to the well as treated water.

In the case of some scales, such as Calcium Sulphate, the rate and extent of scale formation increases with increasing temperature meaning that as the first and/or second solution enters the reservoir its temperature will eventually reach that of the reservoir causing more scale to form and further reducing the effectiveness of the scale inhibitor.

As the scale forms in the reservoir it acts to reduce the permeability of a formation of the reservoir and thereby progressively reduces the ability of hydrocarbons in the reservoir to access the well bore region and thereby acting to seal the reservoir from the surface.

Many oil producing reservoirs are heterogeneous in their permeability and pressure such that when fluid is pumped into the reservoir it will preferentially enter those zones of high permeability and/or low pressure. It may be an advantage that the method of the present invention is self-diverting, that is as the first and/or second solution enters the reservoir, and typically a formation of the reservoir from the well and/or well bore, this reduces the susceptibility of the particular zone of the reservoir to receiving the first and/or second solution, thereby diverting more of the first and/or second solution into other zones, less susceptible to receiving the first and/or second solution. The well bore is then normally rendered impermeable to the reservoir surrounding it.

The step of adding the solutions into the reservoir may continue until the injection pressure is close to or the same as the fracture pressure of the reservoir and/or no further solutions can be added. The step of adding the solutions into the reservoir may include injecting and/or pumping the solutions into the reservoir.

The method may further include the step of injecting a third solution or fluid into the reservoir after the first and/or second solution, also referred to as scaling fluids, to create a 'skin' and/or barrier between the reservoir and the well. The well may be perforated and/or have perforations. The well normally comprises perforations and/or may be perforated at a pay zone(s). The method may further include the step of at least partially filling and/or plugging and/or blocking the well and/or the well in the reservoir and/or perforations in the well with the third solution.

The third solution may comprise one or more of silicone, a vinyl silicone, a vinyl terminated silicone, polydimethylsiloxane, vinyl polydimethylsiloxane, a fumed silica, a silica flour and a siloxane. The third solution typically has a low to medium molecular weight, typically less than 10,000. The third solution typically has a viscosity below 0.5 Pascal seconds at a shear rate of 340 s$^{-1}$ using a chandler viscometer.

In use the third fluid normally creates a barrier between the reservoir and the well. The barrier between the reservoir and the well may prevent or mitigate or at least substantially prevent the passage of oil and/or gas from the reservoir into the well.

A platinum catalyst may be added to the third fluid at a concentration of less than 0.05% or from 0.05% to 0.1%. The platinum catalyst may cause the vinyl polydimethylsiloxane to undergo a crosslinking addition reaction to form a flexible elastic material which further isolates the well from the reservoir. An additional benefit of this step is typically that it results in the formation a flexible self-healing material which swells in the presence of hydrocarbons. An attractive feature of this material is that it will swell in the presence of hydrocarbons sealing any cracks or fissures.

The method may further include the step of at least partially filling and/or plugging the well and/or the well in the reservoir with cement and/or concrete. The cement typically comprises one or more of calcium oxide, silicon dioxide, aluminium oxide, a sulphate and ferric oxide. The concrete is typically a composite material comprising an aggregate, cement and water. The aggregate is normally sand or gravel. The cement may have additional additives to help control gas migration, including microsilica, nanosilica, pozzolanic material, fly ash, styrene-butadiene latex, and/or polyacrylamide fluid loss additives.

The step of adding the first and/or second solution into the reservoir typically results in the formation of scale from 0.1 to 3 metres away from the well and/or wall of the well.

The step of injecting the third solution or fluid into the reservoir typically results in blocking annular spaces, pores, perforations and/or cracks in the reservoir and/or existing cement and/or concrete from an edge of the well to from 0.05 to 0.2 metres, typically from 0.02 to 0.2 metres away from the well and/or wall of the well.

It may be an advantage of the present invention that the combination of injecting the first and/or second solution into the reservoir to form a scale, injecting a third substance into the reservoir and at least partially filling and/or plugging the well in the reservoir, tubing and/or casing with cement and/or concrete, provides three different barriers between the reservoir and the wider environment. This typically improves the end of life well integrity, in that as well as preventing oil escaping from the reservoir the method prevents or at least migrates the release of gas, and/or mitigates the need for recourse to the use of a drilling rig.

After the step of injecting the first and/or second solution into the reservoir to form a scale, the first and/or second solution typically undergoes a change and/or transformation. After the step of injecting the third solution into the reservoir, the third solution typically undergoes a change and/or transformation. The change and/or transformation may be a reaction between other components of the first and/or second solution and the scale inhibitor or a temperature induced precipitation or inorganic precipitation of the first and/or second solution.

It may be an advantage of the present invention that the change and/or transformation results in the creation of blockages in annular spaces, pores and/or cracks in the reservoir. The creation of blockages may be referred to as damaging the reservoir. It may also be an advantage of the present invention that the blockages and/or damage cannot be reversed.

In accordance with a second aspect of the present invention there is provided a method of abandoning a well in a reservoir, the method comprising the steps of:

mixing calcium chloride, sodium sulphate and a scale inhibitor to form a material; and injecting the material into the reservoir to form calcium sulphate.

The step of injecting the material into the reservoir normally includes injecting the material into the reservoir from the well. The well typically has an upper and a lower end. The step of injecting the material into the reservoir to form calcium sulphate may include injecting the material into the reservoir from the upper end and/or lower end of the well.

The calcium sulphate is typically a calcium sulphate scale.

The scale inhibitor may be one or more of a phosphonate polymer; a polyacrylate polymer; a polycarboxylic acid based polymer; a polycarboxylic acid based polysulphonate; a phosphinocarboylic acid salt; and materials thereof.

The amount of scale inhibitor in the material typically controls the rate of formation of the calcium sulphate scale. A reaction between the calcium chloride and sodium sulphate typically forms the calcium sulphate scale. The scale inhibitor typically retards and/or inhibits the reaction between the calcium chloride and sodium sulphate that forms the calcium sulphate scale.

It may be an advantage of the present invention that by retarding and/or inhibiting the reaction between the calcium chloride and sodium sulphate, the formation of the calcium sulphate scale can be controlled and therefore where the calcium sulphate scale is deposited in the reservoir can be controlled.

The method of abandoning a well may be referred to one or more of a method of blocking a well, a method of filling a well, a method of plugging a well and purposeful damage of a well. The method of abandoning a well in a reservoir may include creating blockages in the reservoir, thereby reducing fluid communication between the reservoir and the well, typically from the reservoir to the well. The method of abandoning the well in the reservoir typically results in abandonment of the well, including reducing fluid communication between the reservoir and the well and the surface and/or seabed.

The steps of the method may be represented by the following chemical equation:

$$CaCl_2 + Na_2SO_4 \rightarrow CaSO_4 + 2NaCl$$

Gypsum is typically calcium sulphate dehydrate, that is $CaSO_4 \cdot 2H_2O$. It may be an advantage of the present invention that the calcium sulphate formed when the material is injected into the reservoir is gypsum.

Gypsum is a common mineral in cap and/or bed-rock and is therefore often drilled through when a well and/or well bore is formed. It may be advantage of the present invention that filling pores in the reservoir near the well with gypsum, does not significantly change the geology of the cap and/or bed-rock. It may also be an advantage of the present invention that whilst moderately water-soluble, gypsum is long lasting. It may further be an advantage of the present invention that whilst moderately water-soluble under reservoir conditions, the gypsum solids formed by this method are thermodynamically stable.

The reservoir typically contains a fluid, the fluid may be crude oil and/or natural gas. The reservoir is typically a crude oil and/or natural gas reservoir. The reservoir typically contains crude oil and/or natural gas. The crude oil and/or natural gas may be referred to as hydrocarbons. The well is typically in a hydrocarbon reservoir. The well is typically a production well used to extract crude oil and/or natural from the reservoir.

The fluid in the reservoir is typically under pressure and/or pressurised. The pressure of the fluid normally varies with distance from the well. As the distance from the well increases the fluid pressure typically increases. The increase in fluid pressure may be exponential close to the well. The change in fluid pressure may be less pronounced further away from the well. Prior to abandonment it is known to reduce the pressure in the reservoir to a point where oil and/or hydrocarbons will no longer flow unaided and any oil and/or hydrocarbon loss to the surface occurs as a result of the oil and/or hydrocarbon having a lower density than water and so it floats through conduits between the casing and the reservoir to eventually discharge to the environment.

The method of abandoning a well in a reservoir may be referred to as plugging a well and typically involves blocking the flow of fluid up through the well from the reservoir to surface. It may be an advantage of the present invention that the method of abandoning a well blocks the flow of fluid, typically hydrocarbons and normally both oil and gas, up through the well and restricts the flow of fluid through at least part of the reservoir into the well.

The calcium chloride may be a calcium chloride brine. The sodium sulphate may be a sodium sulphate brine. Seawater or a separate brine solution may be used to make the calcium chloride brine and/or or sodium sulphate brine.

The material normally has a viscosity of from $0.5 \times 10^{-3}$ to $5 \times 10^{-3}$ Pascal seconds. The material may have a low viscosity similar to that of water. It may be an advantage of the present invention that the viscosity of the material is from $0.8 \times 10^{-3}$ to $1.5 \times 10^{-3}$ Pascal seconds because at these viscosities the material is pumpable from the well into the reservoir. The material may be referred to as having a low viscosity. The material is typically pumpable from 0.2 to 3 metres through the reservoir away from the well.

The optional features of the first aspect of the present invention can be incorporated into the second aspect of the present invention and vice versa. In other words, it is explicitly intended that preferred or optional features described in relation to the first aspect of the invention may represent preferred or optional features in relation to the second aspect of the invention, and vice versa An embodiment of the present invention will now be described by way of example only and with reference to the accompanying figures, in which.

Figure 1:
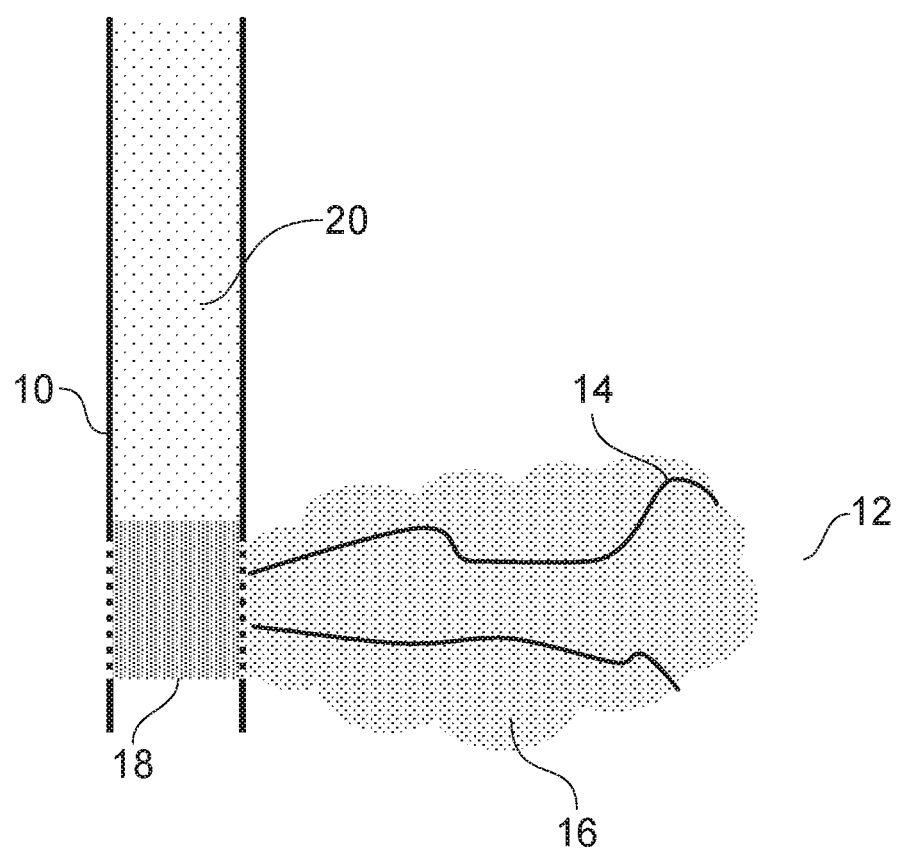
FIG. 1 is a cross-section of a hydrocarbon reservoir.

FIG. 1 shows a well 10 in a hydrocarbon reservoir 12. The hydrocarbon reservoir 12 has outer boundaries 14. Calcium chloride, sodium sulphate and a scale inhibitor are injected into the reservoir 12 to form scale 16. A silicone 18 has been added into the well 10 to block the perforations in the well 10 and the well has been plugged with cement 20.

During the step of injecting the material into the reservoir to form calcium sulphate, the material initially passes into the most permeable sections of the reservoir. Calcium sulphate scale forms and the remaining material is diverted into other zones. At the same time the scale inhibitor adsorbs onto the surfaces of the rock (not shown) of the reservoir, increasing the tendency of the remaining material to form calcium sulphate scale due to a reduced amount of scale inhibitor in the material.

The quantity of calcium sulphate scale required to form a block in the reservoir is considerable. To treat a 100 metre interval with a porosity of 25% such that scale forms a 'skin' that is 50 cms thick from the well bore, requires 19.6 m³ of scale to be deposited. It is not necessary to fill the whole pore space but rather to block the pore throats to mitigate fluid movement and/or reduce the effective permeability of the reservoir.

All fluid flow in a reservoir goes through the pores and pore throats of the reservoir rock. The pore throats are small gaps joined up by pores in the rock, through which the fluid passes. The fluid flow path is often tortuous. The ease with which fluid passes through a rock and therefore the pores and pore throats is known as its permeability.

The flow of fluid can be prevented by blocking the pore throats or by increasing the viscosity of the fluid passing through the pore throats. Because the pore throats are relatively narrow, a comparatively small amount of material in a pore throat can result in a significant amount of damage to the reservoir and therefore reduction in the overall permeability or ability of fluid to flow through the reservoir. If sufficient damage to the reservoir can be induced in the formation, fluid in the reservoir is typically isolated and therefore cannot reach the well.

Figure 2:
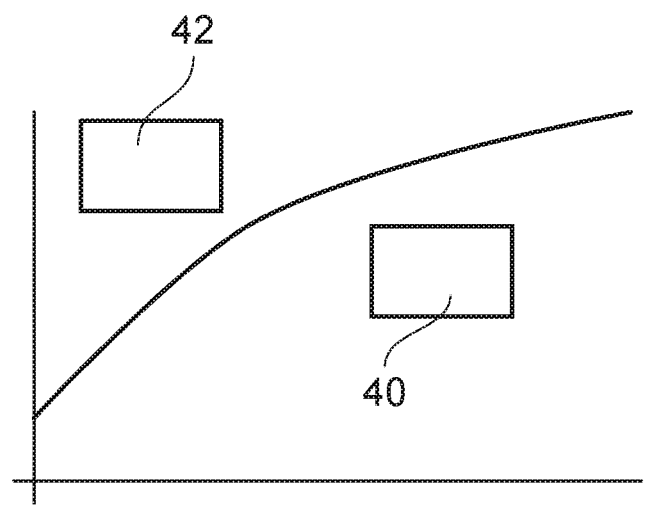
FIG. 2 is a graph of scale inhibitor concentration in a reservoir.

FIG. 2 is a graph of scale inhibitor concentration in a reservoir. The x-axis is time and the y-axis is inhibitor concentration.

The line on the graph of FIG. 2 presents a scaling boundary, that is when scale is produced 40 and when no scale is produced 42. Any point on the line represents a time at which precipitation of scale occurs at a given concentration of scale inhibitor and at a given temperature.

By adjusting the scale inhibitor concentration, the time at which scale is formed and so the point in the well that scale precipitates, can be controlled. It is important that scale does not form in the well bore but only in the formation of the reservoir.

Figure 3:
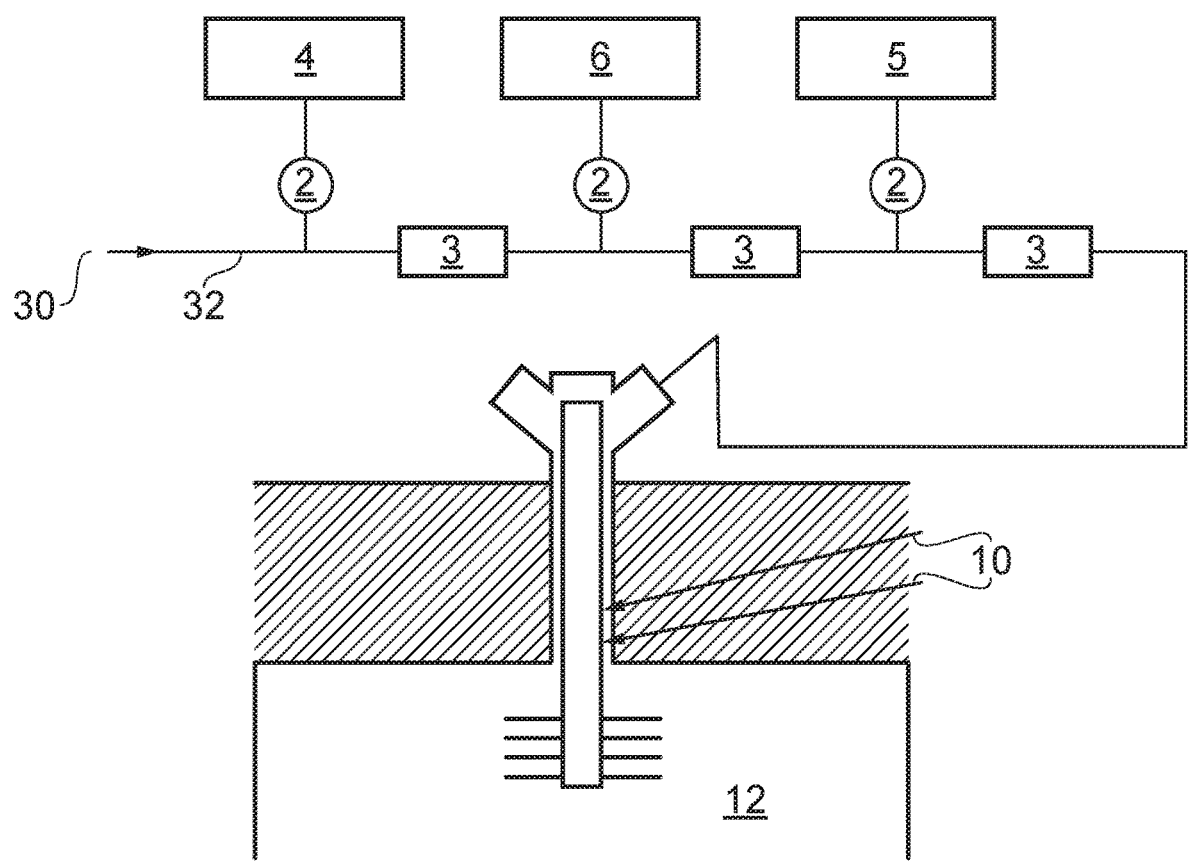
FIG. 3 is a schematic diagram of the method of abandoning a well in a reservoir.

The method of abandoning the well 10 in the hydrocarbon reservoir 12, as shown in FIGS. 1 and 3 includes mixing calcium chloride, sodium sulphate and a scale inhibitor to form a material; and injecting the material into the reservoir to form calcium sulphate.

FIG. 3 shows a source of water 30, typically seawater in offshore locations. This is pumped into the well 10 to be treated via a manifold 32, a saturated solution of Sodium Sulphate brine containing 139 g/lit Sodium Sulphate 4 is dosed into the water such that a concentration of from 0.5 to 1.0 Molar solution of sulphate ions is created in the water. The fluids pass through an inline mixer 3 and is then dosed with scale inhibitor 6 at a concentration of from 0.5 to 2.0 percent before being passed through a second inline mixer 3 and then dosed with saturated Calcium Chloride containing 745 g/ltr Calcium Chloride 5 brine such that a concentration of from 0.8 to 1.2 Molar Calcium ions is created in the water. The whole mixture of brines, scale inhibitor and seawater is then injected into the well at a pump rate set such that the time taken from point of mixing to entry into the reservoir is less than the time taken for the waters to scale. Pumps 2 may be referred to as dosing pumps.

The rate and therefore the location of scale formation within the reservoir can be controlled by making adjustments to the scale inhibitor concentration, the molar concentrations of either Calcium or Sulphate ions or the overall pump rate.

The method may also include injecting into the reservoir a dilute solution of an acid such as hydrochloric acid, formic acid, acetic acid and/or citric acid. The dilute solution of acid is at a concentration of from 0.25 to 5%.

The dilute solution of an acid is injected into the reservoir prior, sometimes just prior, to scale inhibitor treated scaling waters that include the scale inhibitor. The subsequent scale inhibitor treated scaling waters mix with the dilute solution of an acid and on contact therewith this lowers the pH of the scale inhibitor treated scaling waters thereby rendering the scale inhibitor inactive and accelerating the scaling process.

In an alternative embodiment, one of the brines, ideally the second Calcium containing brine 5 maybe pumped via coiled tubing with remaining fluids injected at a well head into the production tubing 8 such that mixing of fluids and the commencement of scale formation occurs across the perforated interval 9 and scale is formed within the reservoir.

The method of abandoning the well 10 in the hydrocarbon reservoir 12 may include the preparation of two separate brines. Brine 4 may be a solution containing 150 g/litre of Calcium Chloride and brine 5 may contain 150 g of Sodium Sulphate in quantities sufficient to fill the near wellbore reservoir to a radial depth of one metre.

Assuming a porosity of 25%, this equates to a volume of approximately 400 litres of each brine per metre of reservoir interval. Both brines are filtered and scale inhibitor is added to both at a concentration sufficient to prevent scale formation. This concentration is determined by a series of experiments and may vary depending on the conditions of the well.

The brines 4 and 5 are pumped into the well and mixed either just prior to entering the well at or close to the well head or at the bottom of the well by means of supplying a separate conduit to the bottom of the well, such as coiled tubing, through which one of the brines is pumped.

Alternatively the brines 4 and 5 are mixed at the surface and pumped via coiled tubing so that they can be placed accurately into specific problematic zones of the reservoir.

Further alternatively, a dilute solution of acid can be pumped into the reservoir formation before the brines 4 and 5. When the brines 4 and 5 contact the dilute solution of acid the pH of the brines 4 and 5 is reduced, thereby rendering the scale inhibitor ineffective. Yet further alternatively the dilute solution of acid can be pumped into the well after the brines 4 and 5 or some of the dilute solution of acid can be pumped into the well before and some after the brines 4 and 5. Fluid is pumped into the reservoir until a back pressure builds up indicating that the permeability of the reservoir is significantly reduced or the back pressure does not exceed the fracture pressure of the reservoir.

Experiments were used to determine the time it took for the formation scale with the addition of Bellasol S50 (™) or Briquest (™) as a scale inhibitor. The experiments were repeated at various inhibitor concentrations and at a pH of 4 and 7.

A plastic cup was placed onto a white sheet of paper with a black cross drawn on it, allowing the formation of calcium sulphate to be evaluated by the disappearance of the cross. 10 ml of the $CaCl_2$ solution and 10 ml of $Na_2SO_4$/inhibitor solution were measured and placed into the plastic cup. As soon as the brines were mixed together a timer was started.

Photos were taken every 30 minutes until the cross was no longer visible. It was however possible to observe a clear development in the formation of scale. In a pre-scaled cup the cross was completely visible. During the progression of scale formation, there was a reduction in visibility of the cross due to low levels of scale formation. A completely hidden cross indicated that the inhibitor had become completely ineffective and scale had fully formed. After 24 hours, the solution was filtered and the precipitate was weighed to determine the mass of calcium sulphate that had formed.

Tables 1a and 1b below show inhibition times, that is how long the formation of scale is inhibited using various concentrations of Bellasol S50 (™) and Briquest 543-45AS (Briquest) (™) inhibitors.

TABLE 1a

| Inhibitor Concentration (ppm) | Volume $Na_2SO_4$ (ml) | Volume $CaCl_2$ (ml) | Low level Calcium sulphate Formation Time (mins) | Full Scale Formation Time (mins) | Mass of precipitate after 24 hours (g) |
|---|---|---|---|---|---|
| | | | Blank | | |
| 0 | 10 | 10 | — | 0 | 55.0 |

| Inhibitor Concentration (ppm) | Conc. $Na_2SO_4$ (M) | Conc. $CaCl_2$ (M) | Low level Calcium sulphate Formation Time (mins) | Full Scale Formation Time (hrs) | Mass of precipitate after 24 hours (g per litre fluid) |
|---|---|---|---|---|---|
| | | | Bellasol S50 | | |
| 5,000 | 1.0 | 1.0 | 30 | 24 | 42.5 |
| 25,000 | 1.0 | 1.0 | 90 | 24 | 40.5 |
| 50,000 | 1.0 | 1.0 | 120 | 24 | 41.0 |
| 75,000 | 1.0 | 1.0 | 180 | 24 | 41.5 |
| 100,000 | 1.0 | 1.0 | 240 | 24 | 44.5 |
| | | | Briquest | | |
| 5,000 | 1.000 | 1.000 | 30 | — | 28.5 |
| 10,000 | 0.739 | 1.06 | 40 | — | 50 |
| 25,000 | 1.000 | 1.000 | 90 | — | 16.0 |
| 50,000 | 1.000 | 1.000 | 720 | — | 12.5 |
| 100,000 | 1.000 | 1.000 | 2880 | — | 11 |

TABLE 1b

| Inhibitor Concentration (ppm) | Volume $Na_2SO_4$ (ml) | Volume $CaCl_2$ (ml) | Low level Calcium sulphate Formation Time (mins) | Full Scale Formation Time (mins) | Mass of precipitate after 24 hours (g) |
|---|---|---|---|---|---|
| | | | Blank | | |
| 0 | 10 | 10 | — | 0 | 1.1 |
| | | | Bellasol S50 | | |
| 5,000 | 10 | 10 | 30 | 24 | 0.85 |
| 25,000 | 10 | 10 | 90 | 24 | 0.81 |
| 50,000 | 10 | 10 | 120 | 24 | 0.82 |
| 75,000 | 10 | 10 | 180 | 24 | 0.83 |
| 100,000 | 10 | 10 | 240 | 24 | 0.89 |

TABLE 1b-continued

| Inhibitor Concentration (ppm) | Volume Na$_2$SO$_4$ (ml) | Volume CaCl$_2$ (ml) | Low level Calcium sulphate Formation Time (mins) | Full Scale Formation Time (mins) | Mass of precipitate after 24 hours (g) |
|---|---|---|---|---|---|
| Briquest | | | | | |
| 5,000 | 10 | 10 | 30 | — | 0.57 |
| 25,000 | 10 | 10 | 90 | — | 0.32 |
| 50,000 | 10 | 10 | 720 | — | 0.25 |
| 100,000 | 10 | 10 | 2880 | — | 0.22 |

A concentration range of inhibitor from 5000 ppm (0.5%) to 100,000 ppm (10%) was used throughout.

100 ml of each inhibitor concentration was prepared. Appropriate volumes of inhibitor were measured into a volumetric flask and made up to 100 ml with Na$_2$SO$_4$. Inhibitors were only added to the Na$_2$SO$_4$ solution due to both being insoluble in CaCl$_2$. The pH of each of inhibitor stock solutions was altered accordingly, see Table 2 below.

TABLE 2

| Inhibitor (ppm) | Buffer solution | pH Required |
|---|---|---|
| Bellasol S50 | NaOH | 7 |
| Briquest | Citric Acid | 4 |

Tables 1a and 1b show that when no inhibitor is applied to the Na$_2$SO$_4$ brine, and the brine is then mixed with CaCl$_2$, the solution becomes fully scaled instantly. When either inhibitor is added to the Na$_2$SO$_4$ brine, the formation of calcium sulphate is initially postponed. When the Bellasol S50 (™) is added, scale production is in two stages. Stage one involves the inhibitor retarding the growth, but not being able to completely block the development of the crystals. This is illustrated by the formation of low levels of calcium sulphate. As time progresses stage two involves the inhibitor becoming less effective and becoming consumed in the growth of the crystal lattice. This is represented by a change from the large crystals into smaller, more stable crystals of calcium sulphate.

It was noted that, in the examples where calcium chloride and sodium sulphate were equimolar, the Briquest (™) inhibitor never allowed the final crystal structure of calcium sulphate to be achieved and only allowed low levels of calcium sulphate to be formed. This indicates that the inhibitor could have been irreversibly adsorbed at the active growth sites of the calcium sulphate scale crystals, resulting in complete blockage, halting the production of the smaller more stable crystals of calcium sulphate. Use of a reduced concentration of sodium sulfate and a slightly increased concentration of calcium chloride resulted in a large gain in scale precipitation, to levels above those seen for Bellasol.

Tables 1a and 1b show that both inhibitors postponed the formation of calcium sulphate for different lengths of time dependant on their concentration. A general trend was that as the concentration was increased, the time taken for the calcium sulphate scale to form also increased. The Bellasol S50 (™) inhibitor prevented the growth of calcium sulphate from 30 minutes to 240 minutes whilst the Briquest (™) inhibitor could inhibit the growth from 30 minutes to 48 hours, although full scaling was never achieved.

The mass of calcium sulphate scale produced after 24 hours using both inhibitors is shown in tables 1a and 1b. When compared to the blank sample it was highlighted that the Bellasol S50 (™) inhibitor produced a comparable mass of precipitate. This is compared to the equimolar brine and Briquest (™) inhibitor tests, which produced a considerably lower mass (around 75% less) compared to the blank sample. However, using a lower ratio of sodium sulfate to calcium sulfate greatly increased the scale produced for Briquest (™).

It was shown that the formation of calcium sulphate scale, from solutions of calcium chloride and sodium sulphate, can be controlled between 30 minutes and 48 hours using different scale inhibitors and adjusting the concentration of the inhibitors and the pH.

Bellasol S50 (™) may inhibit the formation of calcium sulphate for up to 4 hours and produce a comparable mass of calcium sulphate precipitate to the blank sample.

Modifications and improvements can be incorporated herein without departing from the scope of the invention.

The invention claimed is:

1. A method of abandoning a well in a reservoir, the method comprising the step of forming a scale in the reservoir by introducing into the reservoir a first solution comprising a first inorganic salt, the first inorganic salt being soluble and comprising ions selected from the list of: sulphate, carbonate and bicarbonate, a second solution comprising a second inorganic salt, the second inorganic salt being a soluble inorganic salt of Group 2 metal, wherein the first solution and/or second solution further comprises a scale inhibitor and wherein the first solution and second solution are able to react together to form the scale, the method further including the step of at least partially filling the well with cement.

2. A method as claimed in claim 1, wherein the cement comprises one or more of calcium oxide, silicon dioxide, aluminium oxide, a sulphate and ferric oxide.

3. A method as claimed in claim 1, wherein the cement is a component of concrete, the concrete comprises an aggregate, the cement and water.

4. A method as claimed in claim 1, wherein the first and second solutions are introduced separately into the reservoir via separate pathways.

5. A method as claimed in claim 1, wherein both the first and second solution each contain a scale inhibitor.

6. A method as claimed in claim 1, wherein the first inorganic salt is a soluble inorganic salt of a Group 1 metal.

7. A method as claimed in claim 1, wherein the second inorganic salt is selected from the group comprising a calcium or barium salt of a halide or nitrate.

8. A method as claimed in claim 7, wherein the second inorganic salt is calcium chloride.

9. A method as claimed in claim 1, wherein the scale inhibitor is one or more of a phosphonate polymer; a polyacrylate polymer; a polycarboxylic acid based polymer; a polycarboxylic acid based polysulphonate; a phosphinocarboylic acid salt; and materials thereof.

10. A method as claimed in claim 1, wherein the scale inhibitor is a copolymer of acrylic acid and 2-acrylamido-2-methylpropane sulfonic acid, or a phosphonate.

11. A method as claimed in claim 1, wherein a total amount of scale inhibitor provided in the second solution is reduced during the method of abandoning the well in the reservoir.

12. A method as claimed in claim 11, wherein over the duration of the method of abandoning the well in the reservoir, a concentration of scale inhibitor is reduced by at least 25% relative to its initial concentration.

13. A method as claimed in claim 1, wherein the first solution and second solution together define a mixture and wherein, a concentration of the scale inhibitor in the mixture is from 0.5% to 10%.

* * * * *